US012318955B2

(12) United States Patent
Ovvadias et al.

(10) Patent No.: US 12,318,955 B2
(45) Date of Patent: Jun. 3, 2025

(54) HANDLE ASSEMBLY AND RECYCLING PROCESS THEREFOR

(71) Applicant: Bic Violex S.A., Anoixi (GR)

(72) Inventors: Nikolaos Ovvadias, Anoixi (GR); Vasileios Stamoulis, Anoixi (GR); Stratos Christofidellis, Anoixi (GR); Georgios Paspatis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 411 days.

(21) Appl. No.: 17/595,799

(22) PCT Filed: May 28, 2020

(86) PCT No.: PCT/EP2020/064918
§ 371 (c)(1),
(2) Date: Nov. 24, 2021

(87) PCT Pub. No.: WO2020/239955
PCT Pub. Date: Dec. 3, 2020

(65) Prior Publication Data

US 2022/0234229 A1 Jul. 28, 2022

(30) Foreign Application Priority Data

May 29, 2019 (EP) .................................... 19177434

(51) Int. Cl.
*B26B 21/52* (2006.01)

(52) U.S. Cl.
CPC .......... *B26B 21/521* (2013.01); *B26B 21/522* (2013.01); *B26B 21/528* (2013.01)

(58) Field of Classification Search
CPC .......... B26B 21/52; B26B 21/521–523; B26B 21/528
See application file for complete search history.

(56) References Cited

U.S. PATENT DOCUMENTS

| | | | | |
|---|---|---|---|---|
| 4,841,638 A * | 6/1989 | Bardeen | B26B 27/00 30/337 |
| 5,784,790 A | 7/1998 | Carson, III et al. | |

(Continued)

FOREIGN PATENT DOCUMENTS

| | | | |
|---|---|---|---|
| CN | 106061693 A | 10/2016 |
| CN | 106239437 A | 12/2016 |

(Continued)

OTHER PUBLICATIONS

Search Report issued in corresponding Chinese Application No. 202080033202, mailed on May 25, 2023.

(Continued)

*Primary Examiner* — Adam J Eiseman
*Assistant Examiner* — Richard D Crosby, Jr.
(74) *Attorney, Agent, or Firm* — Bookoff McAndrews, PLLC

(57) ABSTRACT

A handle assembly for a hair removal device, including a handle with a connection portion for supporting a hair removal head and an elongated grip portion, at least a first accessory component that is disassemblable from the grip portion, and a holding mechanism, a first portion of the holding mechanism being engageable with a second portion of the holding mechanism to resist disassembly of the first accessory component from the grip portion. A recycling process for the same.

20 Claims, 3 Drawing Sheets

(56) References Cited

U.S. PATENT DOCUMENTS

| | | | | |
|---|---|---|---|---|
| 6,434,828 | B1 * | 8/2002 | Andrews | B26B 21/56 30/529 |
| 6,435,065 | B2 * | 8/2002 | Kozak | B25G 1/085 81/177.4 |
| 6,749,788 | B1 | 6/2004 | Holden et al. | |
| 8,984,700 | B2 | 3/2015 | Pennell et al. | |
| 10,086,521 | B2 * | 10/2018 | Huang | B26B 5/00 |
| 10,131,064 | B2 * | 11/2018 | Efthimiadis | B26B 21/528 |
| 10,807,259 | B2 * | 10/2020 | Bunnell | B26B 21/521 |
| 11,130,247 | B2 * | 9/2021 | Lu | B26B 21/528 |
| 11,358,294 | B2 * | 6/2022 | Johnson | B26B 21/528 |
| 11,511,449 | B1 * | 11/2022 | Zeng | B26B 21/4012 |
| 2004/0216311 | A1 * | 11/2004 | Follo | B26B 21/528 30/526 |
| 2009/0183378 | A1 * | 7/2009 | Eby | B26B 25/005 30/391 |
| 2012/0311865 | A1 | 12/2012 | Hamilton et al. | |
| 2014/0230258 | A1 * | 8/2014 | Eagleton | B26B 21/522 30/527 |
| 2015/0075012 | A1 * | 3/2015 | Opinel | B26B 21/522 30/295 |
| 2015/0328788 | A1 * | 11/2015 | Ren | B26B 21/528 30/526 |
| 2016/0136802 | A1 * | 5/2016 | Bradley | B25G 1/085 81/176.1 |
| 2017/0036363 | A1 * | 2/2017 | Efthimiadis | B26B 21/528 |
| 2017/0190065 | A1 * | 7/2017 | Pound | B26B 21/522 |
| 2017/0282391 | A1 * | 10/2017 | Provost | B26B 21/4012 |
| 2017/0326744 | A1 * | 11/2017 | Liberatore | B26B 21/4012 |
| 2018/0043553 | A1 * | 2/2018 | Lu | B26B 21/222 |
| 2018/0281215 | A1 * | 10/2018 | Dryfhout | B26B 21/4037 |
| 2019/0152079 | A1 | 5/2019 | Chang | |
| 2019/0176355 | A1 * | 6/2019 | Mazarakis | B26B 21/225 |
| 2019/0351565 | A1 * | 11/2019 | Ronan | B26B 5/003 |
| 2020/0290225 | A1 * | 9/2020 | Murgida | B26B 21/225 |
| 2020/0290226 | A1 * | 9/2020 | Lucchese | B26B 21/521 |
| 2020/0398450 | A1 * | 12/2020 | Brellis | B26B 21/52 |
| 2021/0308889 | A1 * | 10/2021 | Lin | B26B 21/521 |
| 2022/0024061 | A1 * | 1/2022 | Christofidellis | B26B 21/52 |
| 2022/0258366 | A1 * | 8/2022 | Johnson | B26B 21/521 |
| 2022/0339809 | A1 * | 10/2022 | Ochiai | A45D 24/02 |
| 2023/0249370 | A1 * | 8/2023 | Usuda | B26B 21/521 |

FOREIGN PATENT DOCUMENTS

| | | | |
|---|---|---|---|
| CN | 106660223 | A | 5/2017 |
| EP | 3398737 | A1 | 11/2018 |
| WO | 2018039168 | A1 | 3/2018 |

OTHER PUBLICATIONS

International Search Report issued in PCT/EP2020/064918 on Sep. 9, 2020 (2 pages).

Gillette Razor Maker List. https://www.gillette.co.uk/razor-maker.list. TheHut.com, Ltd., 2021 [retrieved on Nov. 24, 2021]. Retrieved from the Internet (4 pages).

* cited by examiner

HANDLE ASSEMBLY AND RECYCLING PROCESS THEREFOR

FIELD

This application is a national stage application of International Application No. PCT/EP2020/064918, filed on 28 May 2020, now published as WO2020239955A1, and which claims benefit from European patent application EP19177434.8 filed on 29 May 2019, the entire contents being incorporated herein by reference. The present disclosure relates to the field of skincare, and in particular to shaving. More specifically, the present disclosure relates to multi-piece handle assemblies.

BACKGROUND

When shaving using a razor, user comfort and ease of manipulation may depend on factors such as the weight and shape of the shaver. Some known razors comprise handles formed by several parts assembled together, made by more than one materials, which cannot be easily disassembled after the manufacturing process. Documents US20180043553 and U.S. Pat. No. 6,749,788 disclose such razors.

SUMMARY

It may be desirable to provide a handle which is simple to use on its own in the safe manipulation of a skincare head e.g. exfoliation and/or shaving head, but which can also support one or more additional items detachable therefrom and/or removably attached thereto. The handle and additional items(s) may form a handle assembly in which the additional items are disassemblable from the handle.

According to examples, a handle assembly may be provided. The handle assembly is for a hair removal device. The handle comprises a handle. The handle includes a connection portion for supporting a hair removal head and an elongated grip portion extending therefrom. The handle assembly comprises at least a first accessory component. The first accessory component is disassemblable from the grip portion. The handle assembly comprises a holding mechanism. A first portion of the holding mechanism is engageable with a second portion of the holding mechanism to resist disassembly of the first accessory component from the grip portion.

The holding mechanism includes a first magnetic element and a second magnetic element that is positioned relative to the first magnetic element when the holding mechanism is engaged so that the first and second magnetic elements cooperatively resist disassembly of the first accessory component from the grip portion.

The first accessory component may have a higher overall mass and/or a higher overall density than the grip portion.

The grip portion may comprise a first material. The first accessory component may comprise a second material, different from the first material.

The first accessory component may comprise an outer surface. The outer surface may be contactable by an appendage of a user when the accessory component is assembled to the grip portion. The outer surface may comprise at least one of the following: a depression for receiving at least a portion of the appendage, a protrusion for engaging a concave region of the appendage, and/or a gripping feature. The appendage is for example a palm of the user's hand or a finger of the user's hand, or any other portion of the user's body manipulating the handle.

The holding mechanism may include a press fit that is engageable to resist disassembly of the first accessory component from the grip portion.

The holding mechanism may include a snap fit that is engageable to resist disassembly of the first accessory component from the grip portion.

The first magnetic element may comprise a first magnet. The first magnetic element may be located in the first portion of the holding mechanism, and the second magnetic element may be located in the second portion of the holding mechanism, or vice versa.

The second magnetic element may comprise a second magnet.

The grip portion may comprise a recess in which the first accessory component is receivable.

The grip portion may include a through-hole at the recess.

The first accessory component may comprise the first portion of the holding mechanism.

The handle assembly may comprise at least a second accessory component. The second accessory component may be disassemblable from the grip portion.

The second accessory component may be configured to couple to the first accessory component.

The second accessory component may comprise the second portion of the holding mechanism.

A handle assembly as described herein may offer users enhanced customization options because its handle may be suitable for use as a razor handle even when accessory components are detached therefrom. The user may easily play with the different accessory components to e.g. add/reduce weight of the handle assembly or to change the accessory to select different accessory components which may incorporate a different outer surface thereby changing user's touch experience. Additionally, a handle assembly as disclosed herein may be recycled with ease, owing to the accessory component/components being separable from the handle.

According to examples, a process of recycling may be provided for a handle as disclosed herein. The recycling process comprises disassembling at least one accessory component from a grip portion of a handle, followed by recycling the grip portion and/or the accessory component.

According to embodiments of the present disclosure, the process may comprise recycling the grip portion according to a first recycling process, and recycling the accessory component according to a second recycling process, different from the first recycling process.

According to examples, a kit comprising the handle assembly substantially as disclosed herein and a plurality of accessory components substantially as disclosed herein may be provided. The plurality of accessory components may comprise different materials or the same material. This provides for a customizing option to the user and a more personalized product.

BRIEF DESCRIPTION OF THE DRAWINGS

The disclosure may be more completely understood in consideration of the following detailed description of aspects of the disclosure in connection with the accompanying drawings, in which.

Figure 1A:
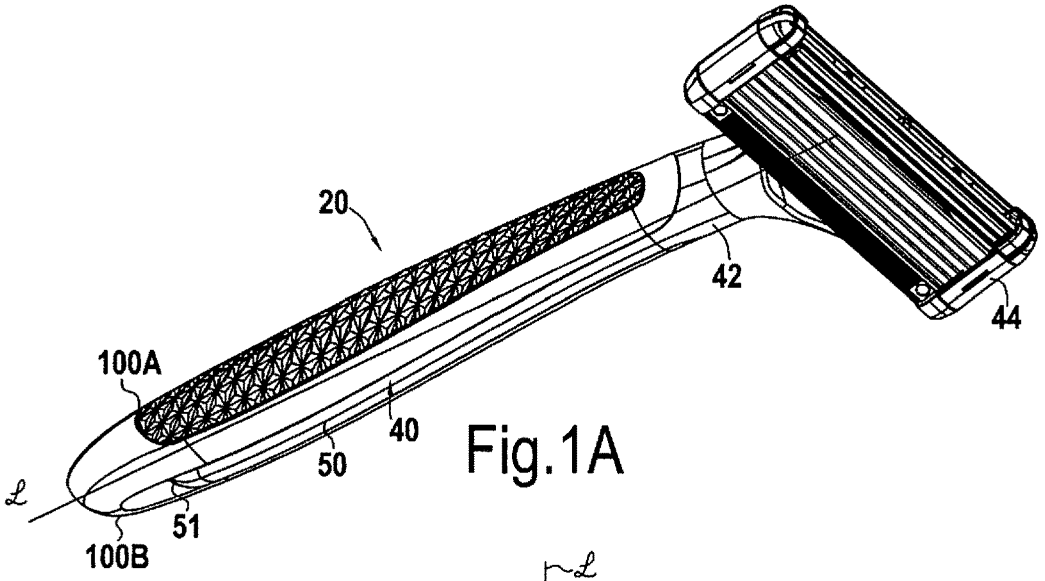
FIG. 1A shows an exemplary shaver including a handle assembly.

While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

FIG. 1A shows a hair removal device, for example a razor, including a handle assembly 20 as described herein, with which a user may be able to manipulate the hair removal device.

The handle assembly 20 comprises a handle 40. The handle 40 includes a connection portion 42 for supporting e.g. a hair removal head, such as a shaver head, for example a razor cartridge 44.

The handle assembly 20 comprises at least a first accessory component 100A. For example, as seen in FIG. 1A, the handle assembly 20 may comprise a first accessory component 100A and a second accessory component 100B.

At least one of the accessory components may be assemblable to the handle 40. For example, as seen in FIG. 1A, both the first accessory component 100A and second accessory 100B component are assemblable to the handle 40.

Figure 1B:
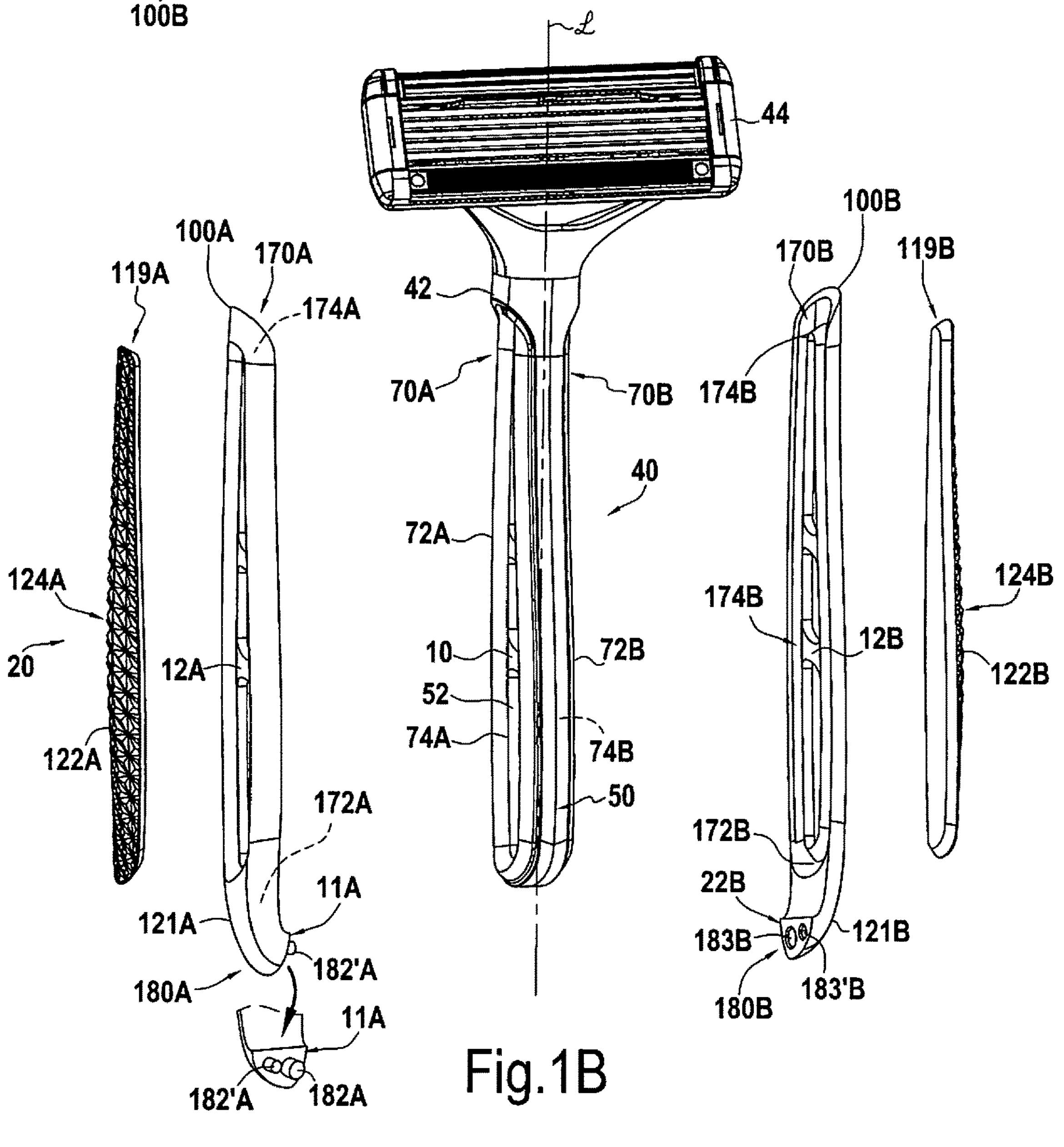
FIG. 1B shows an exemplary exploded view of a shaver including a handle assembly.

Additionally or alternatively, when multiple accessory components are present, two or more of the accessory components may be structurally analogous to one another, except as necessary for possible cooperation with one another. For example, as seen in FIG. 1B, the first 100A and second 100B accessory components are substantially mirror images of each other, except as necessary for them to couple to each other. Accordingly, analogous features on the first and second accessory components share reference numbers and are differentiated from each other by use of the letters A and B, respectively.

The coupling of multiple accessory components to one another may occur when and/or as at least two of them are assembled to the handle 40. For example, in FIG. 1A, assembling both of the first 100A and second 100B accessory components to the handle 40 also causes the first 100A and second 100B accessory components to couple to each other. The first and second accessory components 100A, 100B may have different surface textures and/or colors. Additionally, the hair removal device may be provided as a kit comprising a handle, a head, and a plurality of accessory components. That accessory components may have different features that may be used by the user according to his/her desire.

The handle 40 includes an elongated grip portion 50 extending from the connection portion 42. The handle of the handle assembly as disclosed herein may be suitable for manipulation of the hair removal device, even when the handle is not connected to any accessory component. As such, the handle assembly as disclosed herein may offer a wide range of customization options.

The length of the grip portion 50, in the absence of any accessory component assembled thereto, may be sufficient for safe manipulation by a human hand, and may be sufficient for the hand to close there around.

The grip portion 50 may, for example, have a length of 80-150 mm. The length may be measured along a length axis L running between the connection portion 42 of the handle 40 and a free extremity 51 of the grip portion 50, located opposite the connection portion 42. The grip portion may have a width (as measured perpendicular to the length) of 6-25 mm.

At least one accessory component may be arranged laterally with respect to the handle 40 or grip portion 50 thereof. For example, as seen in FIG. 1A, assembly of the first accessory component 100A and/or the second accessory component 100B to the handle 40 or grip portion 50 may allow the handle assembly 20 to have a greater girth than the handle 40 alone.

Additionally or alternatively, at least one accessory component may be arranged to extend beyond the free extremity 51 of the grip portion 50. For example, as seen in FIG. 1A, assembly of the first accessory component 100A and/or the second accessory component 100B to the handle 40 or grip portion 50 may allow the handle assembly 20 to have a greater length than the handle 40 alone.

At least one of accessory component may be disassemblable from the handle. For example, in FIG. 1B, the handle assembly 20 of FIG. 1A is shown, in which the first accessory component 100A is disassembled from the handle 40.

When multiple accessory components are present, at least two of them may be disassemblable from the handle. For example, in FIG. 1B the first 100A and second 100B accessory components are both disassemblable from the handle 40.

In examples, when multiple accessory components are coupleable to one another, they may be decouplable from one another when and/or as at least one of them is disassembled from the handle. For example, in FIG. 1B, disassembling the first accessory component 100A from the handle may also cause it to decouple from the second accessory component 100B, and/or vice versa.

The handle assembly comprises a holding mechanism, of which a first portion is engageable with a second portion to resist disassembly of at least one accessory component from the handle or grip portion thereof. For example, in FIG. 1B, a first portion 170A is provided on the first accessory component 100A, and is engageable with a second portion 70A that is provided on the grip portion 50 to resist disassembly of the first accessory component 100A from the handle 40.

When multiple accessory components are present, a first of the multiple accessory components may be provided with a first portion of a first holding mechanism, corresponding to a second portion of the first holding mechanism provided on the handle and engageable therewith, and a second of the multiple accessory components may be provided with a first portion of a second holding mechanism, corresponding to a second portion of the second holding mechanism provided on the handle and engageable therewith. For example, in FIG. 1B, the second accessory component 100B and the grip portion 50 are respectively provided with first 170B and second 70B portions of a holding mechanism, which are analogous to the first portion 170A provided on the first accessory component 100A and to the second portion 70A engageable therewith provided on the grip portion 50, respectively.

Additionally or alternatively, when multiple accessory components are coupleable to one another, the holding mechanism may be provided so as to resist decoupling of the accessory components from one another. For example, in FIG. 1B, a first portion 180A of the holding mechanism is provided on the first accessory component 100A, and is engageable with a second portion 180B of the holding mechanism that is provided on the second accessory component 100B.

When multiple accessory components are each assembled to the handle and coupled to each other, resistance of decoupling of the accessory components from each other may serve to resist disassembly of at least one of the accessory components from the handle. For example, as seen in FIGS. 1A-1B, disassembly of the first accessory component 100A from the handle 40 (or the second accessory 100B component from the handle 40) may also cause decoupling of the first 100A and second 100B accessory components from each other. Thus, a holding mechanism that is engageable to resist decoupling of the first and second accessory components from each other may also be able to resist disassembly of the first and/or second accessory component from the handle and this can be done, in examples, without any further coupling elements provided on the handle nor on the gripping portion of the handle.

As a nonlimiting example, at least one first portion of the holding mechanism may comprise one or more female features, and the corresponding second portion(s) of the holding mechanism may comprise a corresponding number of male features, or vice versa. For example, in FIG. 1B, the first accessory component 100A comprises a female feature (groove 172A, analogous to groove 172B visible on second accessory component 100B), and the grip portion 50 comprises a male feature (ridge 72A) receivable in the female feature when the holding mechanism is engaged. Additionally or alternatively, as seen in FIG. 1B, for example the grip portion 50 may comprise a female feature (recess 74A), and the first accessory component 100A may comprise a male feature (protuberance 174A, analogous to protuberance 174B on second accessory component 100B), receivable in the female feature when the holding mechanism is engaged. Moreover, the first portion of the holding mechanism may even comprise a mixture of male and female features, and the second portion of the holding mechanism engageable therewith may comprise a corresponding mixture of male and female features. For example, in FIG. 1B, the first portion 170A of the holding mechanism comprises a groove 172A (female) in combination with a protuberance 174A (male), both of which are more clearly represented as groove 172B and protuberance 174B on second accessory component 100B, and the second portion 70A of the holding mechanism comprises a ridge 72A (male) in combination with a recess 74A (female).

In FIG. 1B, the first accessory component 100A comprises one or more projections 182A, 182'A, and the second accessory component 100B comprises a corresponding number of indentations 183B, 183'B configured to receive the projections therein when the holding mechanism is engaged. Although FIG. 1B shows all projections 182A, 182'A as being provided on the first portion 180A of the holding mechanism, and all of the indentations 183B, 183'B as being provided on the second portion 180B of the holding mechanism, it is equally foreseen to provide one or more projections in combination with one or more indentations on the first portion 180A of the holding mechanism, and a corresponding combination on the second portion 180B of the holding mechanism. As seen in FIG. 1B, when multiple projections and indentations are provided, at least one projection and its corresponding indentation may have a different size or shape from the other projection(s) and indentation(s), so as to serve a keying function between the first 180A and second 180B portions of the holding mechanism.

The use of one or more corresponding projections and indentations is not limited to being provided as a way of resisting decoupling of the accessory components from one another. Rather, it is foreseen as a variant to use these structures as an alternative to or in combination with the corresponding ridge(s) and groove(s), and/or as an alternative to or in combination with the corresponding recess(es) and protuberance(s) to resist disassembly of at least one accessory component from the grip portion. Likewise, the corresponding groove(s) and ridge(s), and/or the corresponding recess(es) and protuberance(s) may be used as an alternative to or in combination with the corresponding projections(s) and indentation(s) to resist decoupling of the accessory components from one another. Moreover, although the corresponding groove(s) and ridge(s) are shown in FIG. 1B as being used in combination with the corresponding recess(es) and protuberance(s), these corresponding features may, as a nonlimiting example, be used independently of each other.

The holding mechanism may include a press fit and/or a snap fit that is engageable to resist disassembly of at least one accessory component from the grip portion. For example, as seen in FIG. 1B, engaging the holding mechanism may cause the ridge(s) 74A, 74B to snap fit and/or press fit into the groove(s) 174A, 174B. Additionally or alternatively, engaging the holding mechanism may cause one or more projections 182A, 182'A to snap fit and/or press fit into the corresponding indentation(s) 183B, 183'B, for example. Additionally or alternatively, engaging the holding mechanism may cause the protuberance(s) 174A, 174B to snap fit and/or press fit into the recess(es) 74A, 74B, for example.

The holding mechanism comprises two or more magnetic elements, of which a first magnetic element may comprise a first magnet, and of which a second magnetic element is positioned relative to the first magnetic element when the holding mechanism is engaged so that the first and second magnetic elements cooperatively resist disassembly of at least one accessory component from the handle or grip portion thereof. As a nonlimiting example, the first magnetic element may be provided in the first portion of the holding mechanism, and the second magnetic element may be provided in the second portion of the holding mechanism engageable therewith, or vice versa.

For example, as seen in FIG. 1B, the first magnetic element 10 may be provided in the handle 40 or the grip portion 50 thereof. The first accessory component 100A may comprise the second magnetic element 12A, for example. The inverse is also foreseen. When the first accessory component 100A is assembled to the handle 40, the first 10 and second 12A magnetic elements engage each other magnetically, allowing them to cooperatively resist disassembly of the first accessory component 100A from the handle 40 or grip portion 50 thereof. According to an example, also represented in FIG. 1B, the second accessory component 100B may also comprise an equivalent magnetic element 12B to that which is provided on the first accessory component, such that the magnetic element 10 provided on the handle 40 cooperatively resists disassembly of each of these accessory components 100A, 100B from the handle 40 or grip portion 50.

As explained earlier, when multiple accessory components are coupled to one another, a holding mechanism that is engageable to resist decoupling of the accessory components from one another can also have the effect of preventing disassembly of at least one of the accessory components from the handle. As seen in FIG. 1B, the first accessory component 100A from may include a first magnetic element 11A, and the second accessory component 100B may include a second magnetic element 22B engageable therewith to cooperatively resist decoupling of the first 100A and second 100B accessory components from one another.

The holding mechanism may comprise magnetic elements independently of whether it comprises male and female parts, or as seen in FIG. 1B magnetic elements 10, 11A, 12A, 12B, 22B may be used in combination with female and male parts. For example, magnetic elements 10, 12A arranged in the recess 74A of the handle and on the protuberance 174A of the accessory component 100A are engageable with one another, and magnetic elements 11A, 22B arranged in at least one of the projections 180A and at least one of the indentations 180B are engageable with one another.

According to examples, the second magnetic element may comprise a second magnet. In examples, the second magnetic element may simply comprise a magnetic material, such as iron, steel, cobalt etc. or any other Ferromagnetic materials, which, in response to an applied magnetic field having a first polarity, is able to produce a magnetic field of an opposite polarity to the first polarity.

According to examples, at least one accessory may be made of a magnetic material. For example, the first accessory component (or the second accessory component, when present) may be made of a magnetic material. In this regard, the accessory component may be considered to be or comprise the second magnetic element.

The first and second magnetic elements may resist disassembly, be it disassembly of the first accessory component (or second accessory component, when present) from the handle or grip portion thereof, or by resisting decoupling of the first and second accessory components from one another, through magnetic attraction, or magnetic repulsion. For example, magnetic repulsion may be suitable for resisting disassembly when disassembly causes the first and second magnetic elements to pass by one another, whereas magnetic attraction may be suitable for resisting disassembly when disassembly does not cause the first and second magnetic elements to pass by one another.

For example, in the holding mechanism shown in FIG. 1B for resisting decoupling of the first accessory component 100A and second accessory component 100B from each other, a magnetic field having a first polarity may be provided at a free extremity of a projection 182A of first portion 180A of the holding mechanism to extend towards a corresponding indentation 183B of the second portion 180B of the holding mechanism. In order to resist disassembly through magnetic attraction when the holding mechanism is engaged, a magnetic field having an opposite polarity to the first polarity may be provided at a closed extremity of the indentation 183B to extend towards the projection 182A. When the free extremity of the projection 182A is inserted in the indentation 183B, magnetic fields attract the first 11A and second 22B magnetic elements to one another, and thus may resist disassembly. Such a configuration may be suitable whether the second magnetic element 22B merely comprises the magnetic material or whether the second magnet is present (and arranged to produce the field having the opposite polarity).

In order to resist disassembly through magnetic repulsion when the holding mechanism is engaged, the first magnetic element 11A may be positioned at the free extremity of the projection 182A such that the magnetic field it produces extends towards a fixed extremity of the projection 182A with a first polarity, and the second magnetic element 22B (which in this configuration comprises the second magnet) may be positioned at an open extremity of the corresponding indentation 183B and arranged to produce a field having a same polarity as the first polarity extending towards the closed extremity. When the free extremity of the projection 182A is intermediate the open and closed extremities of the indentation 183B, the magnetic fields of the first 11A and second 22B magnetic elements repel one another, and thus may resist decoupling.

At least one accessory component may have a higher overall mass and/or a higher overall density than the handle, and/or it may have a higher overall mass and/or a higher overall density than grip portion. For example, as seen in FIG. 1B, the grip portion 50 may comprise a first material, and the first accessory component 100A may comprise a second material, different from the first material.

For example, the grip portion 50 may comprise one or more of the following materials: M-ABS, MBS, Polycarbonate, PET, Copolyester, Polypropylene (including reinforced polypropylene), ABS, HIPS, PC/ABS, PC/PET, Polyacetal, PPE/PS, PLA compound, Polystyrene (GPPS), Polyethylene, Polyamide, Pre- Post-consumer recycled plastic, which may be well-suited for molding. Additionally or alternatively, the grip portion may comprise thermoplastic filaments (e.g. ABS, PLA, nylon, PETG), thermoplastic powders (e.g. polyamide 12, polyamide 11), thermoset photopolymer resins (e.g. standard, ABS-like, PP-like, rubber-like, high temperature) or thermoset liquid resins (e.g. standard, ABS-like, PP-like, rubber-like, high temperature), which may be well-suited for additive manufacturing processes. For example, the first accessory component may comprise any of the materials listed with regards to the grip portion, or, for example one or more of the following materials: M-ABS, MBS, polycarbonate, PET, copolyester, polypropylene, ABS, HIPS, PC/ABS, PC/PET, polyacetal, PPE/PS, thermoplastic filaments (e.g. ABS, Nylon), thermoplastic powders (e.g. polyamide 12, polyamide 11), thermoset photopolymer resins (e.g. ABS-like, PP-like), or thermoset liquid resins (e.g. ABS-like, PP-like). The first accessory component 100A may additionally or alternatively comprise a metal (e.g. Zamak, Aluminum), which may be well-suited for molding or Titanium, Stainless Steel, Cobalt chrome or Nickel which may be well-suited for additive manufacturing processes. For example, as explained earlier, it is foreseen for at least a portion of the first accessory component to comprise a magnetic element, which may include a metal material. The second accessory component 100B (when present) may be made of the same material(s) as the first accessory component 100A, or of different materials from the first accessory component 100A.

At least one accessory component may comprise an outer surface that is contactable by an appendage of a user when the accessory component is assembled to the grip portion.

For example, the outer surface may be contactable by a user's hand. In FIG. 1B, for example, both the first accessory component 100A and the second accessory component 100B present such surfaces 121A, 121B.

The outer surface may provide one or more ergonomic features to the handle assembly. For example, the outer surface may provide at least one of the following: gripping feature, a protrusion for engaging a concave region of the appendage (for example a palm of the user's hand), and a depression for receiving at least a portion the appendage (for example a finger of the user's hand). A gripping feature 122A, 122B is represented in FIG. 1B, for example.

The gripping feature may provide a higher coefficient of friction against a user's skin than the remainder of the outer surface. This coefficient of friction may be provided, for example, through the use of a textured surface and/or a material such as a rubber. For example, the rubber may be an elastomeric or a thermoplastic elastomeric (TPE) material. The rubber may have a hardness of approximately 15-70 Shore A. The gripping feature may include, but are not limited to silicones, natural rubber, butyl rubber, styrene butadiene rubber, polyolefin-based TPEs, styrene butadiene styrene (SBS) TPEs, styrene ethylene butadiene styrene (SEBS) TPEs, polyamide TPEs (such as Pebax), polyester TPEs, or polyurethane TPEs. The gripping feature may include a blend of one or more of these TPEs with other substances. The gripping feature may include a blend of multiple of these TPEs, possibly in combination other substances.

According to examples of the present disclosure, the gripping feature may be provided in combination with at least one other ergonomic feature. For example, in FIG. 1B, the gripping feature 122A of the first accessory component 100A is provided in combination with a protrusion 124A presented on the same outer surface 121A as one another. The same is also visible for the second accessory component 100B with the protrusion 124B. The protrusion 124A and/or 124B may engage the palm of the user's hand, for example.

As seen FIG. 1B, the ergonomic feature(s) may be provided on an insert 119A received in the outer surface 121A of the first accessory component 100A. The same may additionally or alternatively be true for the second accessory component 100B, when present. Use of an insert 119A, 119B to provide the ergonomic feature(s) may enhance recyclability, such as by allowing items materials which cannot be converted back into raw materials through a common process, (as with metal and plastic, for example) to be separated and processed independently from one another.

According to examples, the grip portion 50 may include a through-hole. Use of a through hole may offer weight and/or material reductions in the grip portion. As seen in FIG. 1B, for example, the through-hole 52 may be provided in the recess 74A.

Figure 2:
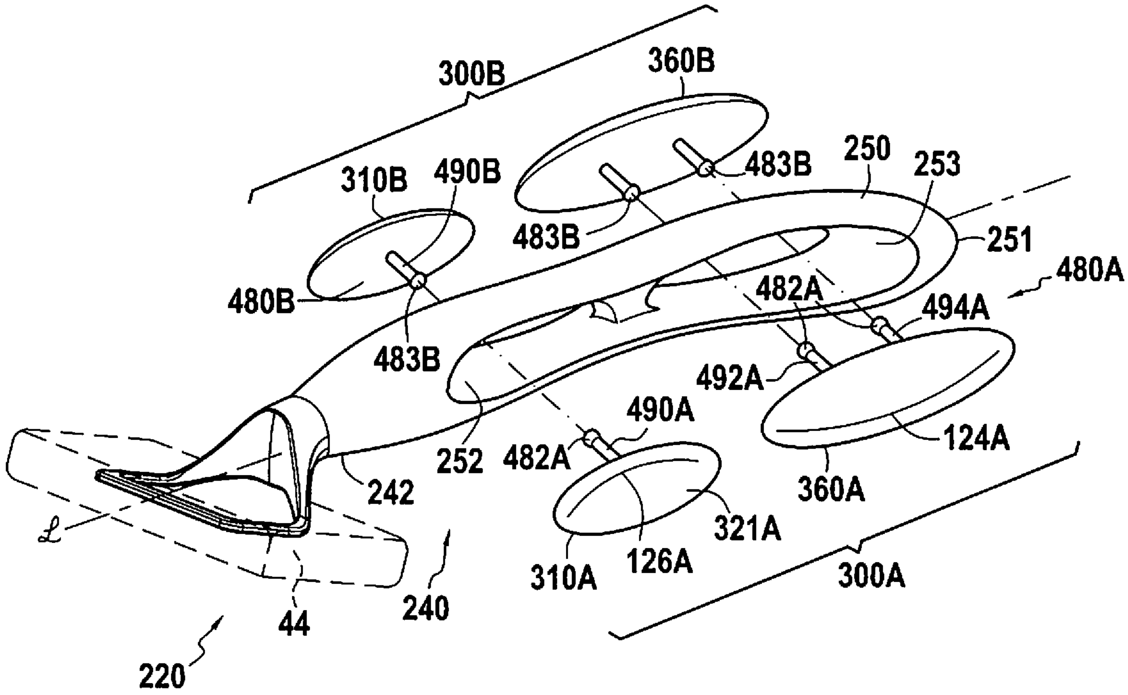
FIG. 2 shows an exemplary exploded view of a shaver including a handle assembly.

FIG. 2 shows a handheld device including a variant 220 of the handle assembly 20 shown in FIG. 1B.

As with the accessory components 100A, 100B shown in FIG. 1B, at least one of the accessory components 300A, 300B shown in FIG. 2 may have a higher overall mass and/or density than the handle 240 and/or the grip portion 250 thereof. Additionally or alternatively, at least one of the accessory components 300A, 300B shown in FIG. 2 may comprise a different material from the grip portion 250.

As seen in FIG. 2, at least one accessory component 300A, 300B may comprise a depression 126A provided on an outer surface 321A of the accessory component. A depression is a nonlimiting example of an ergonomic feature, which is also compatible with a handle assembly substantially as represented in FIG. 1B.

At least one gripping feature 122A may be provided in a handle assembly 220 as shown in FIG. 2. For example, the gripping feature(s) may be provided on one or more accessory components 300A, 300B of the handle assembly 220 as shown in FIG. 2. Such a gripping feature may be used in combination with a depression 126A, or independently therefrom.

In FIG. 2, for example, ergonomic features are provided directly on the accessory component 300A, 300B, rather than on inserts as seen in FIG. 1B. However, it is equally foreseen to provide at least one insert for the at least one accessory component of the handle assembly 220 illustrated in FIG. 2. Generally speaking, provision of multiple ergonomic features (such as a gripping feature on a protrusion or on a depression, for example) is also possible when the ergonomic features are provided directly on the outer surface of an accessory component.

Although, as seen in FIG. 1B it is foreseen to provide accessory components 100A, 100B which attach to the handle 40 and/or which couple to each other around the handle 40, it is also foreseen for accessory components to couple to each other through the handle. For example, as seen in FIG. 2, the first accessory component 300A couples to the second accessory component 300B through the handle 240. To that end, as seen in FIG. 2, the handle 240 may be provided with a through hole 252, 253 through which the first 300A and second 300B accessory components are able to couple to one another. The through-hole 252, 253 may serve to align and/or stabilize the coupled accessory components, such as through contact within the through-hole. In examples, it is also foreseen, though not shown in these figures, that at least one of the accessory components may additionally be press-fit or snap-fit into its respective through-hole, so as to further resist disassembly of the accessory component from the handle.

In FIG. 2, a holding mechanism is provided to resist decoupling of the first 300A and second 300B accessory components from each other. For example a first accessory component 300A may comprise a first portion 480A of the holding mechanism, and a second accessory component 300B, coupleable to the first accessory component 100A, may comprise a second portion 480B of the holding mechanism, or vice versa.

At least one portion of the holding mechanism may be provided on a post extending from one of the accessory components towards another of the accessory components coupleable therewith. For example, as seen in FIG. 2, the first portion 480A of the holding mechanism is arranged on a post 490A extending from one of the first 300A and second 300B accessory components (which are configured to couple to one another) and the second portion of the holding mechanism 480B is provided on the other of the first and second accessory components.

As a nonlimiting example, as seen in FIG. 2, the first accessory component 300A may comprise a post 490A extending towards the second accessory component 300B, and the second accessory component 300B may comprise a post 490B extending towards the first accessory component 300A, and the first 480A and second 480B portions of the holding mechanism may be provided on these posts respectively, or vice versa.

As seen in FIG. 2, for example, the posts 490A, 490B of the first 300A and second 300B accessory components may be substantially equal in length to one another. However, it is also foreseen to provide posts of unequal length within a group of accessory components that are configured to couple to one another.

The first portion 480A of the holding mechanism may comprise a bulb 482A, and the second portion 480B of the holding mechanism may comprise a corresponding socket 483B into which the bulb 482A is snap-fittable. As seen in FIG. 2, the holding mechanism may comprise multiple such bulbs, and a corresponding number of such sockets. As seen in FIG. 2, at least one bulb and/or socket may be borne on a free extremity of a post extending from an accessory component.

Although FIG. 2 shows the first portion 480A of the holding mechanism as comprising only bulbs 482A, and the second portion 480B of the holding mechanism as comprising only sockets 483B, it is also foreseen for the first portion 480A of the holding mechanism to comprise one or more bulbs in combination with one or more sockets, and for the second portion 480B of the holding mechanism to comprise corresponding numbers of sockets and bulbs.

At least one of the accessory components may be provided as a plurality of bodies. For example, in FIG. 2, the first accessory component 300A includes a first body 310A and a second body 360A.

As seen in FIG. 2, the first body 310A may present a depression 126A, and the second body 360A may present a protrusion 124A. It is also foreseen, though not illustrated, that multiple bodies within a given accessory component present similar ergonomic features to one another.

The holding portion of the mechanism provided on a given accessory component may be arranged on each of these bodies. For example, in FIG. 2, the holding mechanism is arranged posts 490A, 492A, 494A, extending from each of the first 310A and second 360A bodies. Although the posts 490A, 492A, 494A extending from these bodies 310A, 360A are represented in FIG. 2 as having substantially equal length to one another, it also foreseen that at least post on the first body 310A has a different length from at least one post on the second body 360A.

As seen in FIG. 2, the holding mechanism may be arranged on a single post 490A extending from the first body 310A, and a plurality of posts 492A, 494A extending from the second body 360A. Although the first 310A and second 360A bodies are shown in FIG. 2 is having dissimilar quantities of posts, it also is foreseen for the bodies of a given accessory component to have a like number of posts.

Although FIG. 2 shows the plurality 492A, 494A of posts of a given body is having substantially equivalent lengths to one another, it is equally foreseen that the posts of a given body have unequal lengths to one another.

As seen in FIG. 2, for example, the first body 310A of an accessory component may be arranged near the connection portion 242 of the handle 240, and the second body 360A of the accessory component may be arranged near the free extremity 251 of the grip portion 250. An inverse configuration to this is also foreseen.

Although FIG. 2 shows the bodies 310A, 360A of the first accessory component 300A as being arranged in series along a length axis L of the handle 240 or grip portion 250 thereof, other arrangements are also foreseen, including (but not limited to) circumferential and/or helical arrangements about the length axis L.

As seen in FIG. 2, the grip portion 250 may comprise a first through-hole 252 and a second through-hole 253. The first body 310A of the first accessory component 300A may be coupleable with the second accessory component 300B through the first through-hole 252, and the second body 360A of the first accessory component 300A may be coupleable with the second accessory component 300B through the second through-hole 253, or vice-versa. At least one of these through-holes may help to align and/or stabilize the corresponding body therein, for example through contact between the body and the through-hole.

As seen in FIG. 2, the second accessory component 300B may also comprise a plurality of bodies 310B, 360B. When both first 300A and second 300B accessory components comprise multiple bodies 310A, 360A, 310B, 360B, at least one body 310B, 360B of the second accessory component 300B may be stabilized and/or aligned by means of a through-hole 252, 253 through which it is coupleable to the first accessory component 300A. When one or more ergonomic features are provided on at least one body of the second accessory component 300B, the ergonomic feature (s) may be selected independently of whatever ergonomic features may be provided on the first accessory component 300A.

Although FIG. 2 shows the second accessory component 300B (to which the first accessory component 300A is coupleable) as comprising a corresponding plurality of bodies 310B, 360B which are each analogous to the bodies 310A, 310B of the first accessory component 300A, it is also foreseen for an accessory component comprising multiple bodies to be coupleable with a one-piece accessory component. Moreover, it is also foreseen that, when the second accessory component comprises multiple bodies, that these bodies be non-analogous to the bodies of the first accessory component.

Figure 3:
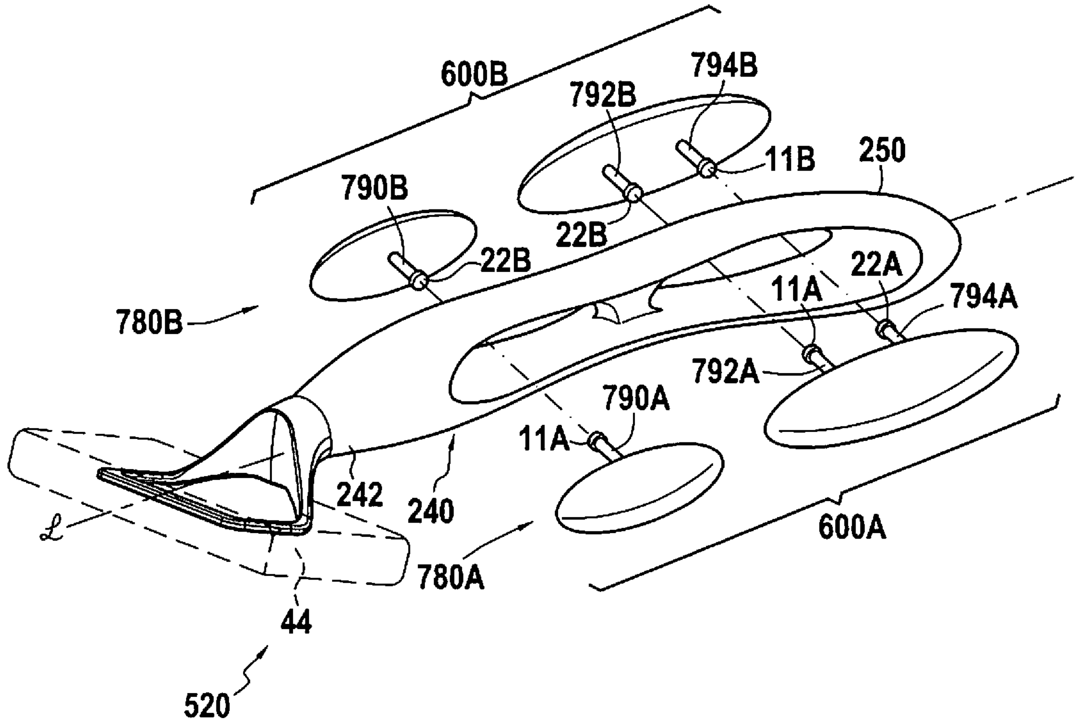
FIG. 3 shows an exemplary exploded view of a shaver including a handle assembly.

FIG. 3 shows a handheld device including a variant 520 of the handle assembly 220 shown in FIG. 2. To resist decoupling of the first 600A and second 600B accessory components from one another, the first 780A and second 780B portions of the holding mechanism comprise a first magnetic element 11A (including a first magnet) and a second magnetic element 22B, respectively, or vice versa. When the first 600A and second 600B accessory components are assembled to the handle 240, the first 780A and second 780B portions of the holding mechanism (and the magnetic elements 11A, 22B respectively comprised thereby) are brought sufficiently close to one another that their respective magnetic elements magnetically engage one another so as to couple the first and second accessory components to each other. This magnetic engagement causes the first 780A and second 780B portions of the holding mechanism to cooperatively resist decoupling of the first 600A and second 600B accessory components from each other.

As seen in FIG. 3, the first 11A and second 22B magnetic elements may be arranged in a substantially similar manner to the bulb(s) 482A and socket(s) 483B shown in FIG. 2. For example, at least one of the first and second magnetic elements may be provided at a free extremity of a post extending from the first accessory component towards the second accessory component. As seen in FIG. 3, the first 11A and second 22B magnetic elements may be provided at free extremities of corresponding posts 790A, 790B, 792A, 792B, 794A, 794B extending respectively from the first 600A and second 600B accessory components, or vice versa.

As seen in FIG. 3, the post(s) 790A, 790B, 792A, 792B, 794A, 794B may have sufficient length to bring the first magnetic element(s) 11A into contact with the second accessory component 600B. As a nonlimiting example, the first magnetic element(s) 11A may contact the second magnetic element(s) 22B directly.

However, it is also foreseen that at least one first magnetic element 11A be made to magnetically engage a corresponding second magnetic element 22B without contacting it directly. For example, the post(s) may be arranged between the first 11A and second 22B magnetic elements.

Moreover, it is also foreseen that at least one first magnetic element 11A be made to magnetically engage a corresponding second magnetic element 22B without direct contact between the first 600A and second 600B accessory components. For example, the length(s) of the post(s) 790A, 790B, 792A, 792B, 794A, 794B may be insufficient for contact between the first 600A and second 600B accessory components, or the post(s) may even be absent.

When an accessory component comprises multiple bodies, the portion of the holding mechanism provided on the accessory body may be provided on each of these bodies. For example, a magnetic element may be provided on each of the bodies 610A, 660A of the first accessory component 600A, and these magnetic elements may be magnetically engageable with one or more magnetic elements provided on the second accessory component 600B.

As seen in FIG. 3, for example, the first bodies 610A, 610B of the first 600A and second 600B accessory components are provided with a pair of magnetic elements, of which at least the first magnetic element 11A comprises a magnet. As a nonlimiting example, the first 11A and second 22B magnetic elements of the pair may be provided in corresponding free extremities of posts 790A, 790B extending from the first bodies 610A, 610B of either accessory component 600A, 600B.

According to an example, and independently of the manner in which the first bodies 610A, 610B couple to one another, the second bodies 660A, 660B of the first 600A and second 600B accessory components may be provided with a pair of magnetic elements 11A, 22B, in a similar manner to that which is described above with regard to the first bodies 610A, 610B.

As seen in FIG. 3, for example, the second bodies 660A, 660B of the first 600A and second 600B accessory components may be provided with four magnetic elements 11A, 22B, 11B, 22A, which are engageable with one another in two pairs, with each pair having at least one magnet.

Figure 4:
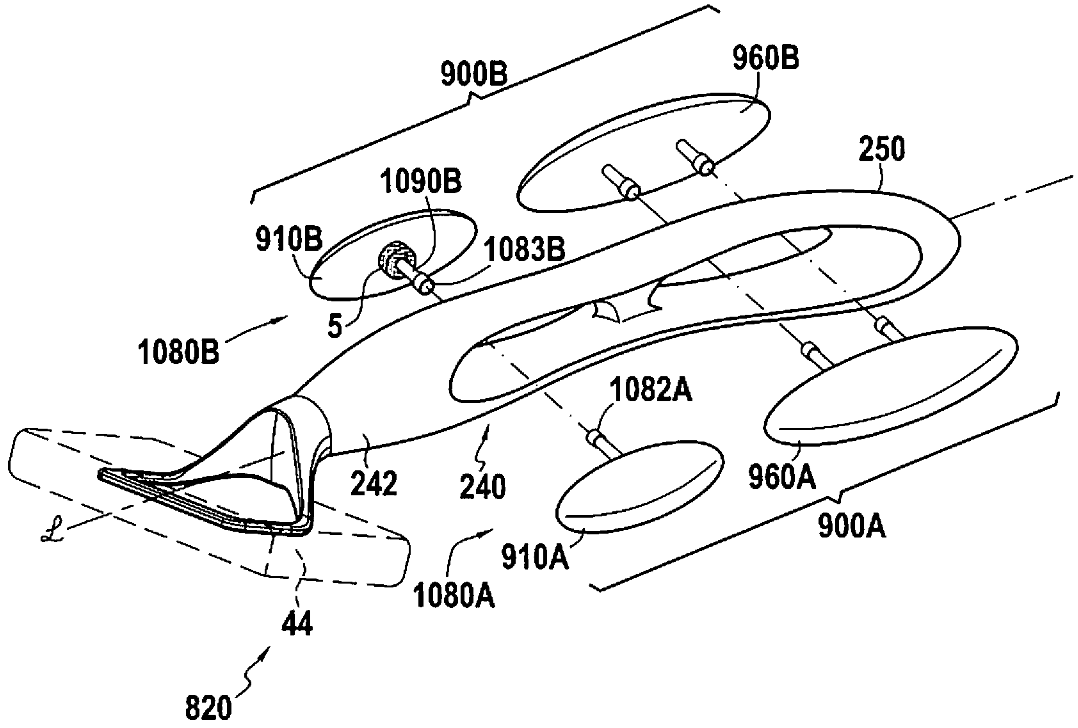
FIG. 4 shows an exemplary exploded view of a shaver including a handle assembly.

FIG. 4 shows a handheld device including a variant 820 of the handle assembly 220 shown in FIG. 2. To resist decoupling of the first 900A and second 900B accessory components from one another, the first 1080A and second 1080B portions of the holding mechanism comprise a rod 1082A and a cavity 1083B respectively, or vice versa. The rod is press-fittable into the cavity. As seen in FIG. 4, the rods and cavities may be arranged in a similar manner to the bulbs and sockets discussed regarding FIG. 2.

As seen in FIG. 4, at least one accessory component 900A, 900B may be provided with a weighted element. For example, in FIG. 4, the second accessory component 900B comprises a post 1090B around which the weighted element 5 is arranged.

The weighted element 5 may be removably attached to the accessory component, which may allow a user to reposition the weighted element 5 with respect to the remainder of the handle assembly 820. For example, in FIG. 4, a user may be able to transfer the weighted element 5 from the first body 910B of second accessory component 900B to the first body 910A of the first accessory component 900A, and/or to the second body 960B of the second accessory component 900B and/or to the second body 960A of the first accessory component 900A. In this way, the user may be able to reposition the center of mass of the handle assembly 820. As a nonlimiting example, the weighted element 5 shown in FIG. 4 may be used with any of the variants shown in FIGS. 2-4. As a nonlimiting example, the handle assembly shown in FIGS. 1A-B may be provided with a weighted element having a different form, for example as one or more weighted inserts.

Although not shown in the figures, the holding mechanism may comprise a mixture of pairs of bulbs and sockets, rods and cavities, and first and second magnetic elements.

Although the figures show pairs of accessory components, it is also foreseen to provide an odd number of accessory components. Moreover, although these figures show multiple accessory components as cooperating with one another (such as by coupling to each other), it is also foreseen to provide at least one accessory component which does not couple to another accessory component. In the examples shown, the accessory components are provided to the side portions of the grip portion, that is, those portions of the grip portion that are directed to the left or to the right of a hand holding the grip portion in a normal orientation of use. Additionally or alternatively, an accessory component may be attached to a back portion of the grip portion, for example to provide a longer handle length to the handle assembly (not shown). The back portion is a portion of the grip portion that is directed to the palm of a hand holding the grip portion in the normal orientation of use. Such accessory components providing a longer handle length may extend beyond the upper end and/or beyond the lower end of the grip portion, the upper end being the one provided with the connection portion 42 or 242.

A handle assembly as disclosed herein may be recycled with ease, owing to the accessory component/components being separable from the handle.

A handle assembly as disclosed herein may be recycled, for example, by disassembling the at least one accessory component from the handle or grip portion thereof. The accessory component may subsequently be recycled according to techniques suitable for the accessory component's constituent materials. As a nonlimiting example, one or more metal recycling techniques, for example one or more ferrous metal recycling technique may be used in recycling the accessory component.

Additionally or alternatively, the handle or grip portion thereof may be recycled, subsequent to disassembly of the accessory component (or components) therefrom, according to techniques suitable for the handle's or grip portion's constituent materials. For example, one or more plastic recycling techniques may be used. For example, when the handle or grip portion is made of ABS, a plastic pyrolysis technique may be used to convert the ABS into fuel oil.

Moreover, unlike known multi-piece handle assemblies, the handle assembly as disclosed herein allows a user to replace one or more items of the handle assembly while conserving the remainder thereof for reuse with replacement items. For example, a user may desire to replace an old handle with a new handle, and to conserve the accessory component/components for reuse with the new handle. Additionally or alternatively, for example, a user may desire to replace one or more old accessory components with one or more new accessory components, and to conserve the handle for reuse with the new accessory component/components.

Although the described embodiments were provided as different exemplary embodiments, it is envisioned that these embodiments are combinable or, when not conflicting, the features recited in the described embodiments may be interchangeable. Moreover, the features recited in the described embodiments are not inextricably linked to one another, unless such a linkage is clearly indicated between two given features.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A handle assembly for a hair removal device, comprising:
- a handle, the handle including:
  - a connection portion for supporting a hair removal head, the connection portion extending from a first end adjacent to the hair removal head to a second end; and
  - an elongated grip portion, the elongated grip portion extending from a first end connected to the second end of the connection portion to a second end;
- a first accessory component that is disassemblable from the elongated grip portion, the first accessory component including a first magnet; and
- a second accessory component that is disassemblable from the elongated grip portion, the second accessory component including a second magnet,
- wherein the first accessory component and the second accessory component are engageable with the elongated grip portion, wherein the first accessory component and the second accessory component are in direct contact with one another via the first magnet and the second magnet, and wherein the elongated grip portion remains connected to the connection portion when the first accessory component and the second accessory component are disassembled from the elongated grip portion.

2. The handle assembly of claim 1, wherein the first accessory component has a higher overall mass and/or a higher overall density than the elongated grip portion.

3. The handle assembly of claim 1, wherein the elongated grip portion comprises a first material, and the first accessory component comprises a second material, different from the first material.

4. The handle assembly of claim 1, wherein the first accessory component comprises an outer surface that is contactable by an appendage of a user when the first accessory component is assembled to the elongated grip portion, the outer surface comprising at least one of the following: a depression for receiving at least a portion of the appendage, a protrusion for engaging a concave region of the appendage, and/or a gripping feature.

5. The handle assembly of claim 1, wherein a holding mechanism includes a press fit or a snap fit that is engageable to resist disassembly of the first accessory component from the elongated grip portion.

6. The handle assembly of claim 1, wherein the first accessory component includes a first post extending away from the first accessory component towards the second accessory component.

7. The handle assembly of claim 6, wherein the first magnet is positioned on the first post.

8. The handle assembly of claim 7, wherein the second accessory component includes a second post extending away from the second accessory component towards the first accessory component, and wherein the second magnet is positioned on the second post.

9. The handle assembly of claim 1, wherein the second magnet is positioned relative to the first magnet when the first accessory component and the second accessory component are engaged so that the first magnet and the second magnet cooperatively resist disassembly of the first accessory component and the second accessory component from the elongated grip portion.

10. The handle assembly of claim 1, wherein the elongated grip portion is a single piece.

11. The handle assembly of claim 1, wherein the elongated grip portion comprises a recess in which the first accessory component is receivable.

12. The handle assembly of claim 11, wherein the recess of the elongated grip portion includes at least one through-hole.

13. The handle assembly of claim 1, wherein the first accessory component and the second accessory component cooperatively engage the elongated grip portion.

14. The handle assembly of claim 1, the handle assembly further including:
- a third accessory component that is disassemblable from the elongated grip portion, the third accessory component including a third magnet; and
- a fourth accessory component that is disassemblable from the elongated grip portion, the fourth accessory component including a fourth magnet,
- wherein the third accessory component and the fourth accessory component are engageable with the elongated grip portion, wherein the third accessory component and the fourth accessory component are in direct contact with one another via the third magnet and the fourth magnet.

15. A process of recycling a handle assembly according to claim 1, comprising disassembling at least one accessory component from a grip portion of a handle, followed by recycling the elongated grip portion and/or the at least one accessory component.

16. A handle assembly for a hair removal device, comprising:
- a handle, the handle including:
  - a connection portion for supporting a hair removal head, the connection portion extending from a first end adjacent to the hair removal head to a second end; and
  - an elongated grip portion, the elongated grip portion extending from a first end connected to the second end of the connection portion to a second end, wherein the elongated grip portion includes at least one through-hole extending entirely through the elongated grip portion perpendicular to a longitudinal axis of the handle assembly, and wherein the elongated grip portion is a single piece;
- at least a first accessory component that is disassemblable from the elongated grip portion, and
- a holding mechanism, a first portion of the holding mechanism being engageable with a second portion of the holding mechanism to resist disassembly of the first accessory component from the elongated grip portion, wherein the holding mechanism includes a first post with a first magnet and a second post with a second magnet, the first post and the second post being positioned relative to one another and within the at least one through-hole of the elongated grip portion, wherein the holding mechanism is engaged so that the first magnet and the second magnet cooperatively resist disassembly of the first accessory component from the elongated grip portion.

17. The handle assembly of claim 16, wherein the elongated grip portion remains connected to the connection portion when the first accessory component is disassembled from the elongated grip portion.

18. The handle assembly of claim 16, wherein the first magnet is provided at a free extremity of the first post, and wherein the second magnet is provided at a free extremity of the second post.

19. A handle assembly for a hair removal device, comprising:

a handle, the handle including:

a connection portion for supporting a hair removal head, the connection portion extending from a first end adjacent to the hair removal head to a second end; and an elongated grip portion, the elongated grip portion extending from a first end connected to the second end of the connection portion to a second end;

a first accessory component that is disassemblable from the elongated grip portion, the first accessory component including a first magnet; and a second accessory component that is disassemblable from the elongated grip portion, the second accessory component including a second magnet, wherein the first magnet is positioned relative to the second magnet such that the first accessory component and the second accessory component are magnetically coupled, wherein the first magnet and the second magnet cooperatively engage and disengage the first accessory component and the second accessory component with the elongated grip portion, and wherein the first accessory component and the second accessory component are entirely between the first end and the second end of the elongated grip portion.

20. The handle assembly of claim 19, wherein the first accessory component and the second accessory component are in direct contact with one another via the first magnet and the second magnet.

* * * * *